United States Patent
Zhong et al.

(10) Patent No.: US 7,402,327 B2
(45) Date of Patent: Jul. 22, 2008

(54) USE OF SURFACTANTS TO SOLUBILIZE WATER-INSOLUBLE SOLIDS IN BEVERAGES

(75) Inventors: Yuanzhen Zhong, Wayne, NJ (US); Peter S. Given, Ridgefield, CT (US); Gino Olcese, Scarsdale, NY (US); Yuan Fang, Cortlandt Manor, NY (US); Steven Gomez, Ossining, NY (US)

(73) Assignee: Pepsico, Inc., Purchase, NY (US)

( * ) Notice: Subject to any disclaimer, the term of this patent is extended or adjusted under 35 U.S.C. 154(b) by 400 days.

(21) Appl. No.: 10/635,542

(22) Filed: Aug. 7, 2003

(65) Prior Publication Data

US 2004/0086619 A1    May 6, 2004

Related U.S. Application Data

(60) Provisional application No. 60/409,666, filed on Sep. 10, 2002.

(51) Int. Cl.
*A23L 2/385* (2006.01)
(52) U.S. Cl. ...................... 426/590; 426/654
(58) Field of Classification Search .......... 426/590, 426/654
See application file for complete search history.

(56) References Cited

U.S. PATENT DOCUMENTS

| | | | | |
|---|---|---|---|---|
| 4,136,163 A | 1/1979 | Watson et al. | ............ | 424/54 |
| 4,230,688 A | 10/1980 | Rowsell et al. | ............ | 424/45 |
| 4,296,093 A | 10/1981 | Rowsell et al. | ............ | 424/45 |
| 4,835,002 A | 5/1989 | Wolf et al. | ............ | 426/590 |
| 4,946,701 A | 8/1990 | Tsai et al. | ............ | 426/597 |
| 5,158,770 A | 10/1992 | Saito et al. | ............ | 424/195.1 |
| 5,320,863 A * | 6/1994 | Chung et al. | ............ | 426/650 |
| 5,389,387 A | 2/1995 | Zuniga et al. | ............ | 426/74 |
| 5,422,128 A | 6/1995 | Burkes et al. | ............ | 426/74 |
| 5,545,424 A | 8/1996 | Nakatsu et al. | ............ | 426/536 |
| 5,753,609 A | 5/1998 | Nakatsu et al. | ............ | 512/8 |
| 5,851,578 A | 12/1998 | Gandhi | ............ | 426/590 |
| 5,871,798 A | 2/1999 | Hutchison et al. | ............ | 426/590 |
| 6,048,566 A | 4/2000 | Behnam et al. | ............ | 426/590 |
| 6,251,441 B1 | 6/2001 | Van Den Braak et al. | ...... | 426/2 |
| 6,426,078 B1 | 7/2002 | Bauer et al. | ............ | 424/401 |
| 6,444,253 B1 | 9/2002 | Conklin et al. | ............ | 426/651 |
| 6,897,195 B2 * | 5/2005 | Su et al. | ............ | 512/1 |
| 2001/0026805 A1 | 10/2001 | Braak et al. | ............ | 424/439 |

(Continued)

FOREIGN PATENT DOCUMENTS

DE    101 09 708    9/2002

(Continued)

OTHER PUBLICATIONS

Patent Abstracts of Japan, vol. 1997, No. 06, Jun. 30, 1997 (corresponds to JP 09-047269).

(Continued)

*Primary Examiner*—Helen F Pratt
(74) *Attorney, Agent, or Firm*—Banner & Witcoff, Ltd.

(57) ABSTRACT

Surfactants are used in low concentrations in order to solubilize water-insoluble solids for inclusion in aqueous beverages. Beverage concentrates, beverage syrups and finished beverages, all of which contain surfactant and water-insoluble solids, are stable; the concentrates and finished beverages are clear.

55 Claims, 2 Drawing Sheets

○  Water-Insoluble solid molecule
▨  Solvent molecule
∕  Surfactant molecule hydrophobic portion
•∕∕•  Surfactant molecule hydrophilic portion

U.S. PATENT DOCUMENTS

2003/0215532 A1  11/2003  Nakatsu et al. ............. 424/734

FOREIGN PATENT DOCUMENTS

| EP | 0 437 840 | 7/1991 |
| EP | 1 077 034 | 2/2001 |
| EP | 1 121 927 | 8/2001 |
| JP | 09-047269 | 2/1997 |
| JP | 2001-131572 | 5/2001 |
| JP | 2003-128542 | 5/2003 |

OTHER PUBLICATIONS

Patent Abstracts of Japan, vol. 2000, No. 22, Mar. 9, 2001 (corresponds to JP 2001-131572).

Patent Abstracts of Japan, vol. 2003, No. 09, Sep. 3, 2003 (corresponds to JP 2003-128542).

* cited by examiner

○    Oil

↲•    Surfactant

∧    Lipophilic portion of surfactant

•    Hydrophilic portion of surfactant

◯ Water-insoluble solid molecule

⊘ Solvent molecule

∫ Surfactant molecule hydrophobic portion

•∿• Surfactant molecule hydrophilic portion

USE OF SURFACTANTS TO SOLUBILIZE WATER-INSOLUBLE SOLIDS IN BEVERAGES

This application claims the benefit of U.S. Provisional Application No. 60/409,666, filed Sep. 10, 2002.

BACKGROUND OF THE INVENTION

1. Field of the Invention

This invention relates to the use of surfactants to solubilize water-insoluble solids in ready-to-drink beverages which are clear, stable and free of crystals, floc, sediment and any other phase separation phenomena. More particularly, the present invention relates to the formation of stable, clear beverage concentrates, beverage syrups and stable, clear finished beverages which contain water-insoluble solids which have been solubilized or micro-solubilized by an amount of surfactant that is substantially less than the amount of surfactant used in known dispersions and often less than the amount of the water-insoluble solids.

2. Related Background Art

A variety of water-insoluble solids are useful ingredients in beverages. Examples of such water-insoluble solids include, without limitation, flavor compounds, taste modifiers, nutrients and colors. While these water-insoluble solids may be dissolved in non-aqueous solvent systems to form solutions, when such solutions are added to a beverage syrup and subsequently included in an aqueous finished beverage, the water-insoluble solids precipitate, crystallize or oil-off due to the overall dilution of the non-aqueous solvent in which the solids were dissolved. In addition, in the absence of suitable surfactant(s), water-insoluble solids form large crystalline pieces or waxy or oily material floating on top in beverage concentrates and syrups, respectively. All of the above-noted phase separation phenomena, aside from the obvious negative aesthetic impact, prevent the effective delivery of flavor to a given beverage.

Hence, there exists a dilemma in the formulation of beverages containing such water-insoluble solids. Many approaches have been taken to address this problem. Most notably, methods such as encapsulation (U.S. Pat. No. 5,871,798), microemulsion (U.S. Pat. Nos. 4,835,002 and 6,251,441), emulsion (U.S. Pat. No. 4,946,701), etc., have been employed. In addition, it is known to simply add a solubilizer such as a surfactant to a beverage system in order to solubilize an otherwise insoluble component (U.S. Pat. Nos. 6,444,253, 6,048,566, 4,136,163, 4,230,688 and 4,296,093).

However, each of these approaches has associated disadvantages. For example, beverages containing encapsulations or emulsions are not optically, visually, clear, i.e., water-clear. What is more, microemulsions, while optically clear and stable, rely on large amounts of co-solvents and large amounts of surfactants; the latter are typically present in an amount that is at least five to ten times the amount of water-insoluble solids present. Such a high requirement for the amount of surfactant has potential negative impacts upon beverage quality and manufacturing efficiency. A finished beverage having such large amounts of surfactant may have off-tastes. In addition, such a beverage may not be amenable to typical beverage manufacturing processes, e.g., the dilution of concentrate to syrup to finished beverage (see above). Further, surfactants are also foaming agents; using a large amount of surfactant will generate foam during carbonated beverage manufacturing, will therefore have an impact on line speed and filling and will thereby complicate the manufacturing process. Finally, large amounts of surfactant may be beyond the regulatory limit in a given beverage market, thereby creating an additional hurdle to be overcome.

In short, there is a need for a method of formulating stable, clear beverages containing water-insoluble solids which does not suffer from the above-noted problems.

SUMMARY OF THE INVENTION

An embodiment of the present invention is directed to a method of forming a stable, clear beverage concentrate containing water-insoluble solids comprising the step of: dissolving said water-insoluble solids in a surfactant to form said stable, clear beverage concentrate. In related embodiments, the present invention is directed to beverage concentrates made by this method and to beverage concentrates comprising water-insoluble solids and a surfactant.

A further embodiment of the present invention is directed to a method of forming a stable beverage syrup containing water-insoluble solids comprising the steps of: (a) dissolving said water-insoluble solids in a surfactant to form a stable, clear concentrate; and (b) adding an aliquot of said stable, clear concentrate to a beverage syrup. In related embodiments, the present invention is directed to beverage syrups made by this method and to beverage syrups comprising water-insoluble solids and a surfactant.

Still another embodiment of the present invention is directed to a method of forming a stable, clear ready-to-drink beverage containing water-insoluble solids comprising the steps of: (a) dissolving said water-insoluble solids in a surfactant to form a stable, clear concentrate; (b) adding an aliquot of said concentrate to a beverage syrup to form a stable beverage syrup; and (c) diluting said stable beverage syrup to form said stable, clear beverage. In related embodiments, the present invention is directed to beverages made by this method and to beverages comprising water-insoluble solids and a surfactant.

In certain preferred embodiments of this invention, the water-insoluble solids are flavor compounds, taste modifiers, nutrients, colors or combinations thereof. In particularly preferred embodiments, the water-insoluble solids consist of at least one flavor compound which imparts a physiological sensation of "cooling" such as 2-isopropyl- N,2,3-trimethyl-butyramide, N-ethyl-p-menthane-3carboxamide (WS3), menthone glycerol ketal, menthyl lactate, (−)-menthoxypropane-1,2-diol, (−)-isopulegol, 4-methyl-3-(1-pyrrolidinyl)-2{5H}-furanone and combinations thereof.

In preferred embodiments of this invention, the weight ratio of water-insoluble solids to surfactant ranges from about 0.25:1 to about 5:1, more preferably from about 1:1 to about 3:1 and most preferably is about 2.5:1.

In certain preferred embodiments of this invention, the surfactant is sorbitan monolaurate (Span 20), sorbitan monopalmitate (Span 40), sorbitan monostearate (Span 60), sorbitan monooleate (Span 80), polyoxyethylene (20) sorbitan monolaurate (Tween 20, polysorbate 20), polyoxyethylene (20) monopalmitate (Tween 40, polysorbate 40), polyoxyethylene (20) monostearate (Tween 60, polysorbate 60), polyoxyethylene (20) tri-stearate (Tween 65, polysorbate 65), polyoxyethylene (20) monooleate (Tween 80, polysorbate 80), sucrose monomyristate, sucrose palmitate/stearate, sucrose stearate, vitamin E including TPGS (tocopherol propylene glycol succinate, a water-soluble form of vitamin E), dioctylsulfosuccinate sodium salt, monoglyceride monooleate, monoglyceride monolaurate, monoglyceride monopalmitate, lecithin, diglyceride mixtures, citric acid esters of monoglycerides, acetic acid esters of monoglycerides, lactic acid esters of monoglycerides, diacetyl tartaric esters of monoglycerides, polyglycerol esters of fatty acids, cyclodextrins, propylene glycol esters of fatty acids, stearoyl lactylates, $C_{8-18}$ free fatty acids or combinations thereof.

DETAILED DESCRIPTION

The present invention relates to the use of surfactants to solubilize water-insoluble solids in beverages. Importantly, the present invention produces clear, stable beverages which contain the desired type and concentration of water-insoluble solids and which are free from crystals, floc, sediment, oil-off and any other phase separation phenomena. "Solubilization", as used herein, refers to the process of suspending one substance into another to form a clear, stable mixture. The mechanism by which the water-insoluble solids are solubilized in the present invention is not entirely understood.

It is, however, clear that the present invention does not seem to fit squarely within the confines of any conventionally understood dispersion. As used herein, "dispersion" refers to the process of suspending one substance into another without any implication as to the appearance or stability of the mixture. Depending on the nature of the substances and technique used, the system formed after dispersion is typically a solution, a micelle, a microemulsion, a submicron emulsion, a polymer lattice, an emulsion or a suspension (i.e., of fine particulates or solids). As will be described in greater detail below, the beverages, syrups and concentrates of the present invention cannot be adequately described by any of those terms.

As used herein, "solution" refers to a clear-appearing system containing solute and solvent(s), which are completely miscible. A solution is thermodynamically stable; therefore, no phase separation occurs with the elapse of time.

As used herein, "micelle" refers to a system in which a surfactant aggregates at the molecular level. The size of a micelle is approximately about 5 to 10 nm. There is a critical minimum concentration for a surfactant associated with micelle formation. Below the critical micelle concentration (CMC), a surfactant is merely in solution; above the CMC, discrete particles or micelles spontaneously form. Micelles can deliver water-insoluble components via intercalation of the components with the hydrophobic portion of the micelle. To act as a delivery system, it is generally required to have a molecular excess of surfactant over water-immiscible component.

Figure 1:
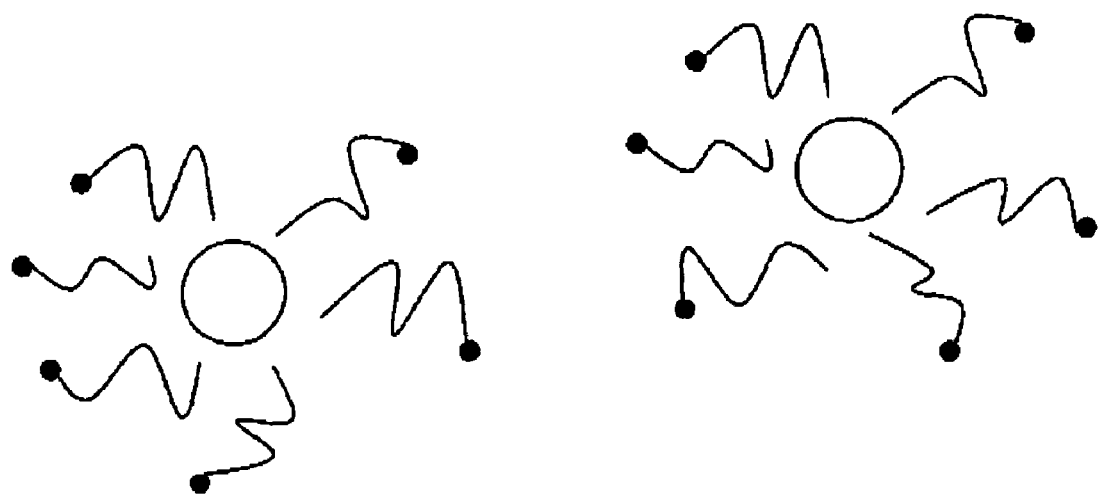
FIG. 1 is a representation of the solubilization mechanism of a conventional microemulsion.

As used herein, "microemulsion" refers to a clear-appearing system containing at least two immiscible (mutually insoluble) components (oil phase and water phase) and at least one emulsifier or surfactant component. FIG. 1 illustrates the dispersion mechanism of microemulsion. In particular, it can be seen that droplets or micro-droplets are formed and that each droplet comprises an oil phase (which may contain water-insoluble solids) in the center and many surfactant molecules which "wrap" the oil phase with the lipophilic portions of the surfactant molecules toward the inside of the droplet and the hydrophilic portions of the surfactant molecules toward the outside. To form a microemulsion and to prevent the aggregation of the oil phase, the amount of emulsifier or surfactant must exceed the critical micelle concentration (CMC) and usually is at least five to ten times the amount of the dispersed component. The size of droplets in a microemulsion is about 5 to 100 nm, smaller than the wavelength of visible light (about 100 nm). Therefore, a microemulsion is clear. A microemulsion is also thermodynamically stable, is spontaneously formed, i.e., the mixing sequence does not matter, and has a reversible phase change, i.e., if phase separation occurs at an elevated temperature, uniform appearance returns upon temperature decrease.

As used herein, "emulsion" refers to a system consisting of two immiscible phases, namely, droplets (disperse phase) dispersed in a liquid medium (oil in water or water in oil). To disperse one phase into another immiscible phase, a third component, being an emulsifier or surfactant, is required. "Emulsion" typically refers to a macroemulsion, as compared to a microemulsion. The size of droplets in an emulsion ranges from about 200 to >1,000 nm, in the range of or larger than the wavelengths of visible light; accordingly, an emulsion is opaque. In addition, emulsions are thermodynamically unstable, i.e., phase separation will occur sooner or later.

As used herein, "beverage" refers to, without limitation, carbonated soft drinks, fountain beverages, frozen ready-to-drink beverages, coffee beverages, tea beverages and liquid concentrates, sport drinks and alcoholic products; the beverage may be carbonated or noncarbonated. In addition, in certain embodiments of the invention, "beverage" refers also to juice, dairy and other non-clear beverages. As used herein, "water-insoluble" refers to a substance which has a very low, i.e., almost zero, solubility in water; more particularly, as used herein, "water-insoluble" refers to a solubility less than 1 ppm, i.e., less than 0.0001%.

As used herein, "clear" refers to optical clarity, i.e., a beverage that is as clear as water. In a preferred embodiment of the present invention, the beverage concentrate and/or the finished beverage are clear as evidenced by a reading by a HACH Turbidimeter (Model 2100AN, Hack Company, Loveland, Colo.) of around 1 NTU (Nephelometric Turbidity Units) and not more than 3 NTU. When such a reading is as high as around 5 to 10 NTU, a sample is not clear, but rather slightly hazy or very slightly hazy.

As used herein, a "stable" beverage concentrate refers to a clear concentrate in which no phase separation occurs, i.e., no floc, sediment, haze, or oil-off at 40° F., 70° F., 90° F., and 110° F. over a period of 4 weeks and, more preferably, over a period of more than 6 months. As used herein, a "stable" beverage syrup refers to a syrup in which no phase separation occurs, i.e., no crystal or waxy or oily material floating on the top, at room temperature over a period of more than 3 days. As used herein, a "stable" finished beverage refers to a clear beverage in which no phase separation occurs, i.e., no crystal, sediment, haze, or oil-off at 40° F., 70° F., 90° F., and 110° F. over a period of 4 weeks and, more preferably, over a period of more than 4 weeks, preferably more than 6 months, i.e., within the typical shelf-life of the finished beverage.

The first embodiment of the present invention is directed to a method of forming a stable, clear beverage concentrate containing water-insoluble solids. The concentrate is made by dissolving water-insoluble solids in a surfactant to form a beverage concentrate.

Suitable water-insoluble solids include, without limitation, flavor compounds, taste modifiers, nutrients and colors. In a preferred embodiment of the present invention, the water-insoluble solids are flavor compounds, most preferably flavor compounds capable of imparting the physiological sensation of "cooling". Such compounds suitable for use in the present invention include, but are not limited to, 2-isopropyl- N,2,3-trimethylbutyramide, N-ethyl-p-menthane-3-carboxamide (WS3), menthone glycerol ketal, menthyl lactate, (−)-menthoxypropane-1,2-diol, (−)-isopulegol, 4-methyl-3-(1-pyrrolidinyl)-2{5H}-furanone and combinations thereof. More information on such compounds can be found at www.leffingwell.com.

Suitable surfactants include, without limitation, sorbitan monolaurate (Span 20), sorbitan monopalmitate (Span 40), sorbitan monostearate (Span 60), sorbitan monooleate (Span 80), polyoxyethylene (20) sorbitan monolaurate (Tween 20, polysorbate 20), polyoxyethylene (20) monopalmitate (Tween 40, polysorbate 40), polyoxyethylene (20) monostearate (Tween 60, polysorbate 60), polyoxyethylene (20) tri-stearate (Tween 65, polysorbate 65), polyoxyethylene (20) monooleate (Tween 80, polysorbate 80), sucrose monomyristate, sucrose palmitate/stearate, sucrose stearate, vitamin E including TPGS (tocopherol propylene glycol succinate, a water-soluble form of vitamin E), dioctylsulfosuccinate sodium salt (DOSS), monoglyceride monooleate, monoglyceride monolaurate, monoglyceride monopalmitate, lecithin, diglyceride mixtures, citric acid esters of monoglycerides, acetic acid esters of monoglycerides, lactic acid esters of monoglycerides, diacetyl tartaric esters of monoglycerides, polyglycerol esters of fatty acids such as decaglycerol monocaprylate/caprate, triglycerol monooleate, decaglycerol monostearate, decaglycerol dipalmitate, decaglycerol monooleate, decaglycerol tetraoleate and hexaglycerol dioleate, cyclodextrins (α, β, or γ), propylene glycol esters of fatty acids such as dicaprate esters, mono and dicaprylate ester blends and diesters of caprylate and capric acids, stearoyl lactylates, free fatty acids (preferably $C_{8-18}$) and combinations thereof.

The water-insoluble solids may be dissolved in the surfactant using any suitable mixing means, e.g., agitation under an agitator. The weight ratio of water-insoluble solids to surfactant used preferably ranges from about 0.25:1 to about 5:1, more preferably ranges from about 1:1 to about 3:1, and most preferably is about 2.5:1.

In an alternative embodiment of the present invention, the dissolution of water-insoluble solids in surfactant is accomplished by the steps of (a1) dissolving the water-insoluble solids in a non-aqueous solvent to form a solution and then (a2) adding a surfactant to the solution to form a beverage concentrate. In other words, the water-insoluble solids may be dissolved in a non-aqueous solvent prior to the addition of and concomitant dissolution in the surfactant. Such steps may be facilitated by obtaining a commercially available non-aqueous solution containing water-insoluble solids such as any one of a variety of solutions available from Takasago (Rockleigh, N.J.) which contain water-insoluble flavor solids. Alternatively, the non-aqueous solution containing water-insoluble solids may be made by adding water-insoluble solids to a non-aqueous solvent and mixing until the water-insoluble solids are completely dissolved. Such an operation can be accomplished using any known mixing means, e.g., agitation under an agitator. It may be necessary to use heat in order to accomplish complete and irreversible dissolution.

Importantly, the surfactant must be miscible with the solution of water-insoluble solids in non-aqueous solvent.

Suitable non-aqueous solvents include, without limitation, propylene glycol, ethanol, citric acid, benzyl alcohol, triacetin, limonene and combinations thereof.

In an additional and optional step of the present inventive method, a co-solvent is added to the beverage concentrate. Sometimes such an addition is necessary; in particular, if a non-aqueous solvent is employed and neither the non-aqueous solvent nor the surfactant are miscible with water, it is necessary to add a co-solvent that is miscible with all of water, the non-aqueous solvent and the surfactant. What is more, the addition of a co-solvent facilitates later dilution of the beverage concentrate regardless of the water miscibility of the non-aqueous solvent and the surfactant. It is important to note that if a co-solvent is employed, it must be added after the addition of surfactant. Suitable co-solvents include, without limitation, propylene glycol, ethanol, citric acid, benzyl alcohol, triacetin, limonene and combinations thereof. In particularly preferred embodiments of the present invention, a combination of propylene glycol and ethanol, most preferably a 60:40 combination, or a combination of ethanol and citric acid, most preferably a 90:10 combination, is used. The co-solvent may be the same solvent or solvents used to make the non-aqueous solution containing the water-insoluble solids of step (a1) of the present inventive method; in addition, the co-solvent may be different. The amount of co-solvent can be readily determined by one of ordinary skill in this art; simply put, it must be an amount sufficient to act as a "bridge" between the surfactant and water and preferably ranges from about 30% to about 70%, more preferably from about 50% to about 60%, by total weight of the beverage concentrate.

Additional ingredients may be included in the beverage concentrate. Such additional ingredients include, without limitation, flavor components such as limonene, flavor extracts, e.g., lemon, lime, other citrus fruits, acidulants, preservatives and anti-oxidants. Such additional ingredients are added into the non-aqueous solution after the addition of the surfactant; in fact, in certain preferred embodiments, such additional ingredients are dissolved in co-solvent and then this mixture is combined with the beverage concentrate containing the water-insoluble solids, surfactant and optional non-aqueous solvent. Typically, an amount of additional ingredient ranging from about 0.5% to about 20%, preferably from about 1% to about 10%, and more preferably from about 3% to about 7%, by weight of the total concentrate can be employed; as can be readily appreciated by one of ordinary skill in this art, the exact amounts of additional ingredients will vary from beverage to beverage depending upon desired finished beverage taste, etc.

The beverage concentrate resulting from the present inventive method is clear and stable. Accordingly, a second embodiment of the present invention is directed to a clear, stable beverage concentrate containing water-insoluble solids and a surfactant. A related third embodiment of the present invention is directed to a beverage concentrate made according to the method of the first embodiment of the invention.

A fourth embodiment of the present invention is directed to a method of forming a stable beverage syrup containing water-insoluble solids. The beverage syrup is made by (a) dissolving said water-insoluble solids in a surfactant to form a concentrate; and (b) adding an aliquot of said concentrate to a beverage syrup. Step (a) of this inventive method is identical to the method of the first embodiment of the present invention detailed above. This fourth embodiment of the invention also includes the optional steps, i.e., use of non-aqueous solvent, addition of co-solvent, and additional ingredients, i.e., flavor component in non-aqueous solution, as set forth above.

The beverage syrup suitable for use in the present invention can be any aqueous beverage syrup typically used to make a beverage as defined herein. Most beverage syrups will include ingredients such as preservatives such as sodium benzoate, nutritive sweeteners such as sucrose or high fructose corn syrup, non-nutritive sweeteners such as aspartame, pH adjusters such as citric acid and malic acid, pH buffers such as sodium citrate, anti-oxidants such as ascorbic acid, flavors such as lemon/lime and cola, and water; however, a beverage syrup suitable for use in the present invention can include any conventionally employed beverage ingredient.

In this step of the present inventive method, the size of the aliquot of beverage concentrate to be added to the beverage syrup, as well as the amount of syrup to which the aliquot is added, can be readily determined by one of ordinary skill in this art, depending upon the desired pack-out. For example, for a 1 gallon per unit (GPU) configuration, approximately 3.4 ml concentrate would be added to approximately 500 ml syrup; similarly, for a 0.5 GPU configuration, approximately 1.7 ml concentrate would be added to approximately 500 ml syrup.

The beverage syrup resulting from the present inventive method is physically stable. Accordingly, a fifth embodiment of the present invention is directed to a stable beverage syrup containing water-insoluble solids and a surfactant. A related sixth embodiment of the present invention is directed to a beverage syrup made according to the method of the fourth embodiment of the invention.

A seventh embodiment of the present invention is directed to a method of forming a stable, clear beverage containing water-insoluble solids. The beverage is made by (a) dissolving said water-insoluble solids in a surfactant to form a concentrate; (b) adding an aliquot of said concentrate to a beverage syrup; and (c) diluting said beverage syrup to form said stable, clear beverage. Steps (a) and (b) of this inventive method are identical to those detailed above with regard to the first and fourth embodiments of the present invention. This seventh embodiment of the invention also includes the optional steps, i.e., use of non-aqueous solvent, addition of co-solvent, and additional ingredients, i.e., flavor component in non-aqueous solution, as set forth above.

Dilution of the beverage syrup to form a finished beverage can be accomplished by any conventional means. The beverage syrup can be diluted with carbonated water, non-carbonated water, or a combination thereof. Typically, dilution is accomplished via a 1+5 throw, i.e., one gallon of syrup with five gallons of water. However, many suitable variations may be determined by those of ordinary skill in this art.

The finished beverages resulting from the present inventive method are clear and stable. Accordingly, an eighth embodiment of the present invention is directed to a clear, stable beverage containing water-insoluble solids and a surfactant. The amount of water-insoluble solids present in the finished beverage ranges from about 0.01 ppm to about 400 ppm, preferably from about 1 ppm to about 100 ppm, and more preferably from about 20 ppm to about 35 ppm; the amount of surfactant present in the finished beverage ranges from about 0.005 ppm to about 200 ppm, preferably from about 0.5 ppm to about 50 ppm, and more preferably from about 5 ppm to about 15 ppm. A related ninth embodiment of the present invention is directed to a beverage made according to the method of the seventh embodiment of the invention.

The finished beverage resulting from the present inventive method is clear and stable. In fact, the appearance of a finished beverage of the present invention is so clear that one of ordinary skill in this art would believe the beverage to be a microemulsion system. However, the present inventors have determined that not to be the case; certain experimental results have verified the absence of a microemulsion system.

First, a microemulsion requires that the amount of a surfactant be beyond its CMC to form an emulsion. In aqueous medium, for Tween 20, the CMC is 0.07% (700 ppm); for Tween 60, the CMC is 0.03% (300 ppm); and for Tween 80, the CMC is 0.015% (150 ppm). However, the concentration of surfactant in a finished beverage of the present invention is typically about 5 ppm to about 15 ppm for these surfactants. Hence, the concentration of surfactant in the finished beverages of the present invention is at least one order of magnitude below a corresponding CMC, making the formation of micelles impossible.

Second, microemulsions require that the amount of surfactant be several times that of the dispersed substance, thereby enabling the surfactant to form droplets which "wrap" around the dispersed substance as shown in FIG. 1 and as described above. However, in the finished beverages of the present invention, the concentration of the water-insoluble solids, e.g., cooling compound, is approximately 25 to 35 ppm, while as noted above, the concentration of a surfactant such as Tween is approximately about 5 ppm to about 15 ppm. Thus, the formation of droplets to wrap around the dispersed water-insoluble solids is impossible. The water-insoluble solids have smaller molecular weights than the surfactants used in the present invention; therefore, on a molar basis, the concentration difference between the surfactants and the water-insoluble solids in the concentrate/syrup/beverage is even greater.

Third, microemulsion is a spontaneous process, and preparation sequence should not impact the system. However, mixing sequence does, indeed, have an impact on the stability of the finished beverages of the present invention. For example, when the water-insoluble solids along with a small amount of solvent are first mixed with surfactant and then with a large amount of co-solvent and subsequently water is added, the finished beverage has better stability, as compared to the case in which the water-insoluble solids with a small amount of co-solvent are first mixed with a large amount of co-solvent, then surfactant and then ultimately water.

Accordingly, it is clear that the finished beverage and, indeed, the concentrate and beverage syrup of the present invention are not a microemulsion, as they lack all of the distinguishing characteristics of such. Further, the present inventors have proposed a new mechanism to explain the solubilization or micro-solubilization of water-insoluble solids according to the present invention. Without being bound to theory, it is believed that the mechanism of solubilization of the present invention can be represented by FIG. 2. As shown therein, the lipophilic portion of each surfactant molecule "wraps" the water-insoluble solid molecules. When the molecular weight of the lipophilic portion of surfactant molecules is larger than the molecular weight of the water-insoluble solid molecules, it is possible for the lipophilic portion of one surfactant molecule to "wrap" more than one water-insoluble solid molecule. In other words, one surfactant molecule can potentially solubilize more than one water-insoluble solid molecule. "Wrapping" is conceivably due to hydrophobic interactions between the lipophilic portion of the surfactant and the water-insoluble solids, thus lowering the free energy of the mixture and achieving a stable dispersion. The solubilization occurs at the molecular level. Hence, it is appropriate to refer to the mechanism of the present invention as micro-solubilization.

Such a mechanism would effectively prevent crystallization or aggregation of the water-insoluble solids. There may still be some water-insoluble solids molecules dispersed in the water phase, but such a dispersion would be in the very low ppm or ppb concentration range where trace amounts of the water-insoluble solids are soluble. Such a mechanism explains why an amount of surfactant well below a relevant CMC is sufficient to keep a beverage clear and stable. Such a mechanism also explains why the mixing sequence is critical. When water-insoluble solids are first mixed with surfactant, the surfactant molecules have a good opportunity to find and wrap the water-insoluble solids molecules; then, when the mixture is then mixed and diluted with co-solvent and then water, the hydrophilic portion of the surfactant will immerse in the water, thereby preventing the aggregation of water-insoluble solids and lending to increased stability and clarity. When the water-insoluble solids are first mixed with co-solvent and/or water, and then surfactant, the concentration of surfactant is so low, the opportunity for surfactant molecules to find the water-insoluble solids molecules and wrap them is much lower, and the system is therefore less stable.

While all of the above-discussed embodiments of the invention have been directed to the achievement of clear, stable concentrates, stable syrups and clear, stable beverages, the present invention may also be applied to non-clear concentrates, syrups and beverages such as juice and dairy beverages. Such beverages, by virtue of their inclusion of ingredients such as milk solids and pulp, are not clear. However, it is clear that while the inclusion of surfactant in such a non-clear beverage would not result in a clear beverage, the inclusion of surfactant according to the present invention will nonetheless stabilize any water-insoluble solids as discussed above contained therein.

Accordingly, tenth through twelfth embodiments of the present invention are directed to a method of forming a stable beverage concentrate containing water-insoluble solids, a stable beverage concentrate containing water-insoluble solids and a surfactant and a beverage concentrate made according to the method of the tenth embodiment of the invention. The details of these embodiments of the invention are the same as those for the first through third embodiments discussed above, including optional steps, i.e., use of non-aqueous solvent, addition of co-solvent, and additional ingredients, i.e., flavor component in non-aqueous solution, as set forth above. The only difference is that, by virtue of certain additional ingredients contained in the beverage concentrate, the beverage concentrate is stable but not clear.

In addition, thirteenth through fifteenth embodiments of the present invention are directed to a method of forming a stable beverage containing water-insoluble solids, a stable beverage containing water-insoluble solids and a surfactant and a beverage made according to the method of the thirteenth embodiment of the invention. The details of these embodiments of the invention are the same as those for the seventh through ninth embodiments discussed above, including optional steps, i.e., use of non-aqueous solvent, addition of co-solvent, and additional ingredients, i.e., flavor component in non-aqueous solution, as set forth above. The only difference is that, by virtue of certain additional ingredients contained in the beverage, the beverage is stable but not clear.

The examples which follow are intended as an illustration of certain preferred embodiments of the invention, and no limitation of the invention is implied.

In Examples 1-64 given below, the water-insoluble solid flavors were cooling compounds, which were dissolved in non-aqueous solvents; these materials were provided by Takasago International Corporation, 4 Volvo Drive, P.O. Box 932, Rockleigh, N.J. 07647-0932.

Figure 2:
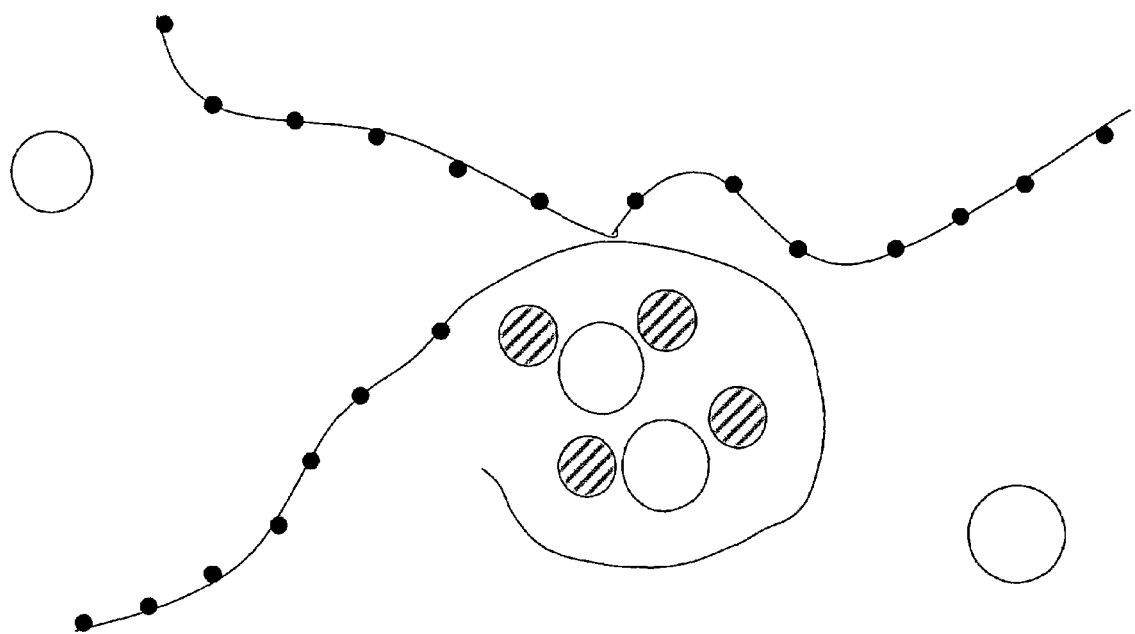
FIG. 2 is a representation of the proposed solubilization mechanism of the microsolubilization of the present invention.

In each of Examples 1-54 given below, the mixture of water-insoluble solid flavor (cooling compound) and non-aqueous solvent contained about 5.6% (by weight) cooling compound. When surfactant was added into the mixture, the water-insoluble solid flavor molecules had less opportunity to find the surfactant molecules to form a micro-solubilization than in Examples 55-64, the structure of which is represented by FIG. 2. The beverage concentrate, beverage syrup, and finished beverage made from these mixtures of water-insoluble solid flavor and non-aqueous solution had less stability. For example, under 110° F., finished beverage would have phase separation of very fine particles appearing in the liquid after 4 weeks. Such stable characteristics are good enough for finished beverage industrial practice.

In contrast, in each of Examples 55-64 given below, the mixture of water-insoluble solid flavor (cooling compound) and non-aqueous solvent contained about 57% (by weight) cooling compound. When surfactant was added into the mixture, the water-insoluble solid flavor molecules had a very good opportunity to find the surfactant molecules to form a micro-solubilization, the structure of which is represented by FIG. 2. The beverage concentrate, beverage syrup, and finished beverage made from these mixtures of water-insoluble solid flavor and non-aqueous solution had very good stability. For example, under 110° F., a finished beverage did not have phase separation of very fine particles appearing in the liquid after 6 months. Such stable characteristics are acceptable for finished beverage industrial practice.

EXAMPLES 1-54

Beverage concentrates were made according to the present invention by combining the ingredients set forth in Table 1 below. The ingredients were simply mixed in a 250 ml beaker using an overhead stirrer; slight heating was necessary when using polysorbate 60. In addition to the ingredients listed in Table 1, 1 g limonene was also used as a co-solvent in each example.

TABLE 1

Examples 1-54 formulations.

| | mixture of water-insoluble solid flavor and non-aqueous solvent | | | water-insoluble flavor in ethanol | | | amount water-insoluble solid flavor in finished beverage | amount surfactant in finished beverage | weight ratio of water-insoluble solid flavor to surfactant in finished |
|---|---|---|---|---|---|---|---|---|---|
| | solvent system | (g) | surfactant | (g) | (g) | co-solvent | (g) | (ppm) | (ppm) | beverage |
| 1 | PG:ethanol 60:40 | 100.0 | sorbitan monolaurate | 2.0 | 2.07 | PG:ethanol 60:40 | 94.93 | 30 | 10.7 | 2.8 |
| 2 | PG:ethanol 60:40 | 100.0 | Tween 60 | 2.0 | 2.07 | PG:ethanol 60:40 | 94.93 | 30 | 10.7 | 2.8 |
| 3 | PG:ethanol 60:40 | 100.0 | sodium dioctylsulfosuccinate | 2.0 | 2.07 | PG:ethanol 60:40 | 94.93 | 30 | 10.7 | 2.8 |
| 4 | PG:ethanol 60:40 | 100.0 | monoglyceride - monooleate | 2.0 | 2.07 | PG:ethanol 60:40 | 94.93 | 30 | 10.7 | 2.8 |
| 5 | PG:ethanol 60:40 | 100.0 | monoglyceride - monolaurate | 2.0 | 2.07 | PG:ethanol 60:40 | 94.93 | 30 | 10.7 | 2.8 |
| 6 | PG:ethanol 60:40 | 100.0 | sorbitan monooleate | 2.0 | 2.07 | PG:ethanol 60:40 | 94.93 | 30 | 10.7 | 2.8 |
| 7 | PG:ethanol 60:40 | 100.0 | decaglycerol monocaprylate/ | 2.0 | 2.07 | PG:ethanol 60:40 | 94.93 | 30 | 10.7 | 2.8 |

TABLE 1-continued

Examples 1-54 formulations.

| | mixture of water-insoluble solid flavor and non-aqueous solvent | | | | water-insoluble flavor in ethanol | | | amount water-insoluble solid flavor in finished beverage | amount surfactant in finished beverage | weight ratio of water-insoluble solid flavor to surfactant in finished |
|---|---|---|---|---|---|---|---|---|---|---|
| | solvent system | (g) | surfactant | (g) | (g) | co-solvent | (g) | (ppm) | (ppm) | beverage |
| | | | caprate | | | | | | | |
| 8 | PG:ethanol 60:40 | 100.0 | decaglycerol monooleate | 2.0 | 2.07 | PG:ethanol 60:40 | 94.93 | 30 | 10.7 | 2.8 |
| 9 | PG:ethanol 60:40 | 100.0 | hexaglycerol dioleate | 2.0 | 2.07 | PG:ethanol 60:40 | 94.93 | 30 | 10.7 | 2.8 |
| 10 | PG:ethanol 60:40 | 100.0 | sucrose ester - monomyristate | 2.0 | 2.07 | PG:ethanol 60:40 | 94.93 | 30 | 10.7 | 2.8 |
| 11 | PG:ethanol 60:40 | 100.0 | vitamin E - TPGS in hot water | 2.0 | 2.07 | PG:ethanol 60:40 | 94.93 | 30 | 10.7 | 2.8 |
| 12 | PG:ethanol 60:40 | 100.0 | propylene glycol mono- and dicaprylate esters | 2.0 | 2.07 | | | 30 | 10.7 | 2.8 |
| 13 | PG:ethanol 60:40 | 100.0 | propylene glycol dicaproate ester | 2.0 | 2.07 | | | 30 | 10.7 | 2.8 |
| 14 | PG:ethanol 60:40 | 100.0 | caprylate diesters of propylene glycol | 2.0 | 2.07 | | | 30 | 10.7 | 2.8 |
| 15 | PG:ethanol 60:40 | 100.0 | sorbitan monolaurate or monooleate | 1.0 | 2.07 | | | 30 | 5.4 | 5.55 |
| 16 | PG:ethanol 60:40 | 100.0 | sorbitan monolaurate or monooleate | 2.0 | 2.07 | | | 30 | 10.7 | 2.8 |
| 17 | PG:ethanol 60:40 | 100.0 | sorbitan monolaurate or monooleate | 4.0 | 2.07 | | | 30 | 21.4 | 1.4 |
| 18 | ethanol:citrate 90:10 | 100.0 | sorbitan monolaurate or monooleate | 1.0 | 2.07 | | | 30 | 5.4 | 5.55 |
| 19 | ethanol:citrate 90:10 | 100.0 | sorbitan monolaurate or monooleate | 2.0 | 2.07 | | | 30 | 10.7 | 2.8 |
| 20 | ethanol:citrate 90:10 | 100.0 | sorbitan monolaurate or monooleate | 4.0 | 2.07 | | | 30 | 21.4 | 1.4 |
| 21 | PG:ethanol 60:40 | 100.0 | sorbitan monolaurate or monooleate | 10.0 | 4.76 | | | 30 | 53.5 | 0.56 |
| 22 | PG:ethanol 60:40 | 100.0 | sorbitan monooleate | 2.0 | | triacetin | 11.6 | 30 | 10.7 | 2.8 |
| 23 | PG:ethanol 60:40 | 100.0 | sorbitan monooleate | 2.0 | | benzyl alcohol | 10.4 | 30 | 10.7 | 2.8 |
| 24 | PG:ethanol 60:40 | 100.0 | sorbitan monolaurate | 1.0 | 4.76 | PG:ethanol 60:40 | 93.24 | 30 | 5.4 | 5.55 |
| 25 | PG:ethanol 60:40 | 100.0 | sorbitan monolaurate | 2.0 | 4.76 | PG:ethanol 60:40 | 92.24 | 30 | 10.7 | 2.8 |
| 26 | ethanol:citrate 90:10 | 100.0 | sorbitan monolaurate or monooleate | 1.0 | 4.76 | ethanol:citrate 90:10 | 93.24 | 30 | 5.4 | 5.55 |
| 27 | ethanol:citrate 90:10 | 100.0 | sorbitan monolaurate or monooleate | 2.0 | 4.76 | ethanol:citrate 90:10 | 92.24 | 30 | 10.7 | 2.8 |
| 28 | ethanol:citrate 90:10 | 100.0 | sorbitan monolaurate or monooleate | 4.0 | 4.76 | ethanol:citrate 90:10 | 90.04 | 30 | 21.4 | 1.4 |
| 29 | PG:ethanol 60:40 | 100.0 | Tween 60 | 5.5 | 4.76 | | | 30 | 29.4 | 1.02 |
| 30 | PG:ethanol 60:40 | 100.0 | Tween 60 | 11.0 | 4.76 | | | 30 | 58.85 | 0.51 |
| 31 | ethanol:citrate 90:10 | 100.0 | Tween 60 | 5.5 | 4.76 | | | 30 | 29.4 | 1.02 |
| 32 | ethanol:citrate 90:10 | 100.0 | Tween 60 | 11.0 | 4.76 | | | 30 | 58.85 | 0.51 |
| 33 | PG:ethanol 60:40 | 100.0 | Tween 60 | 5.5 | 4.76 | PG:ethanol 60:40 | 88.74 | 30 | 29.4 | 1.02 |
| 34 | PG:ethanol 60:40 | 100.0 | Tween 60 | 11.0 | 4.76 | PG:ethanol 60:40 | 83.24 | 30 | 58.85 | 0.51 |
| 35 | ethanol:citrate 90:10 | 100.0 | Tween 60 | 5.5 | 4.76 | ethanol:citrate 90:10 | 88.74 | 30 | 29.4 | 1.02 |
| 36 | ethanol:citrate 90:10 | 100.0 | Tween 60 | 11.0 | 4.76 | ethanol:citrate 90:10 | 83.24 | 30 | 58.85 | 0.51 |
| 37 | ethanol:citrate 90:10 | 100.0 | Tween 60 | 1.5 | 2.06 | | | 30 | 8.0 | 3.75 |
| 38 | ethanol:citrate 90:10 | 100.0 | Tween 60 | 3.5 | 2.06 | | | 30 | 18.73 | 1.6 |
| 39 | ethanol:citrate 90:10 | 100.0 | Tween 60 | 5.5 | 2.06 | | | 30 | 29.4 | 1.02 |
| 40 | ethanol:citrate 90:10 | 100.0 | Tween 60 | 7.5 | 2.06 | | | 30 | 40.13 | 0.75 |
| 41 | ethanol:citrate 90:10 | 100.0 | Tween 60 | 9.5 | 2.06 | | | 30 | 50.83 | 0.59 |
| 42 | ethanol:citrate 90:10 | 60.0 | Tween 60 | 1.79 | 2.06 | ethanol:citrate 90:10 | 40.0 | 18 | 8.9 | 2.02 |
| 43 | ethanol:citrate 90:10 | 100.0 | Tween 60 | 3.57 | 2.06 | | | 30 | 19.1 | 1.57 |
| 44 | ethanol:citrate 90:10 | 60.0 | Tween 60 | 3.57 | 2.06 | ethanol:citrate 90:10 | 40.0 | 18 | 19.1 | 0.94 |
| 45 | ethanol:citrate 90:10 | 100.0 | Tween 60 | 1.79 | 2.06 | ethanol:citrate 90:10 | | 30 | 9.6 | 3.13 |
| 46 | ethanol:citrate 90:10 | 100.0 | decaglycerol monocaprylate/caprate; decaglycerol monostearate; decaglycerol dipalmitate; decaglycerol tetraoleate; decaglycerol monooleate; triglycerol monooleate | 4.0 | 2.06 | | | 30 | 21.4 | 1.4 |
| 47 | ethanol:citrate 90:10 | 100.0 | cetodan 90-50 acetate esters | 2.0 | 4.76 | | | 30 | 10.7 | 2.8 |
| 48 | ethanol:citrate 90:10 | 100.0 | Tween 60 | 1.79 | 2.47 | | | 30 | 9.6 | 3.13 |
| 49 | ethanol:citrate 90:10 | 100.0 | Tween 60 | 3.57 | 2.47 | | | 30 | 19.1 | 1.57 |
| 50 | ethanol:citrate 90:10 | 100.0 | Tween 60 | 1.79 | 3.09 | | | 30 | 9.6 | 3.13 |
| 51 | ethanol:citrate 90:10 | 100.0 | Tween 60 | 3.57 | 3.09 | | | 30 | 19.1 | 1.57 |
| 52 | ethanol:citrate 90:10 | 100.0 | sucrose monomyristate; sucrose palmitate; sucrose stearate in hot water | 2.0 | 2.47 | | | 30 | 10.7 | 2.8 |

TABLE 1-continued

Examples 1-54 formulations.

| | mixture of water-insoluble solid flavor and non-aqueous solvent | | | water-insoluble flavor in ethanol | | | | amount water-insoluble solid flavor in finished beverage | amount surfactant in finished beverage | weight ratio of water-insoluble solid flavor to surfactant in finished |
|---|---|---|---|---|---|---|---|---|---|---|
| | solvent system | (g) | surfactant | (g) | (g) | co-solvent | (g) | (ppm) | (ppm) | beverage |
| 53 | ethanol:citrate 90:10 | 60.0 | Tween 60 | 0.895 | 4.13 | ethanol:citrate 90:10 | 40.0 | 18 | 4.8 | 3.75 |
| 54 | ethanol:citrate 90:10 | 100.0 | Tween 60 | 0.895 | 4.13 | | | 30 | 4.8 | 6.25 |

Next, either 3.4 ml of beverage concentrate of each of examples 1-11, 22-28 and 33-36 (1 GPU configuration) or 1.7 ml of beverage concentrate of each of Examples 12-21, 29-32 and 37-54 (0.5 GPU configuration) was used to make 500 ml of a beverage syrup having the constitution set forth in Table 2 below. Each of the finished beverages of Examples 1-54 was stable and clear for 4 weeks.

TABLE 2

Syrup formula (0.5 liter).

| sodium benzoate | 0.475 g |
|---|---|
| sucrose | 319 g |
| citric acid anhydride | 3.135 g |
| malic acid | 1.6 g |
| sodium citrate | 1.4 g |
| flavor | 5.08 ml |
| concentrate | 3.4 ml or 1.7 ml |
| water | Q.S. 0.5 L |

EXAMPLES 55-64

Phase A: In a 250-ml beaker with a stirring bar inside, 9.28 g of a mixture of water-insoluble solid flavor (cooling compound) and non-aqueous solvent (from Takasago: 57% water-insoluble flavor, 22% benzyl alcohol, and 20% limonene) was combined with an amount of a surfactant as set forth in Table 3 below. The mixture was stirred for 30 minutes. The concentrations of surfactant in finished beverages prepared later were in the range from 2.5 ppm to 20 ppm, as given in Table 3 below, while the concentration of water-insoluble solid flavor in finished beverages prepared later was 25 ppm.

TABLE 3

Examples 55-64 formulations.

| | surfactant | | amount water-insoluble solid flavor in finished beverage (ppm) | ratio of water-insoluble solid flavor to surfactant in finished beverage |
|---|---|---|---|---|
| | identity | amount in concentrate (g) | amount in finished beverage (ppm) | | |
| 55 | Tween 20 | 4.47 | 20 | 25 | 1.25 |
| 56 | Tween 20 | 2.24 | 10 | 25 | 2.5 |
| 57 | Tween 60 | 4.47 | 20 | 25 | 1.25 |
| 58 | Tween 60 | 2.24 | 10 | 25 | 2.5 |
| 59 | Tween 80 | 4.47 | 20 | 25 | 1.25 |
| 60 | Tween 80 | 2.24 | 10 | 25 | 2.5 |

TABLE 3-continued

Examples 55-64 formulations.

| | surfactant | | amount water-insoluble solid flavor in finished beverage (ppm) | ratio of water-insoluble solid flavor to surfactant in finished beverage |
|---|---|---|---|---|
| | identity | amount in concentrate (g) | amount in finished beverage (ppm) | | |
| 61 | Tween 60 | 4.47 | 20 | 25 | 0.63 |
| | Tween 80 | 4.47 | 20 | | |
| 62 | Tween 80 | 4.47 | 20 | 25 | 0.63 |
| | Span 80 | 4.47 | 20 | | |
| 63 | Tween 80 | 4.47 | 20 | 25 | 1.0 |
| | Span 80 | 1.12 | 5 | | |
| 64 | Tween 80 | 2.24 | 10 | 25 | 2.0 |
| | Span 80 | 0.56 | 2.5 | | |

Phase B: In another 250-ml beaker with a stirring bar inside, 9.35 g of citric acid and 68.80 g ethanol were stirred until all the citric acid dissolved. The amount of ethanol was adjusted based on the amount of surfactant(s) used to ensure a total of 100 g of concentrate was made.

Then Phase A was transferred completely into Phase B and stirred for 30 minutes to form a uniform beverage concentrate. The concentrate was clear and stable. No phase separation occurred, i.e., no floc, sediment, haze, or oil-off, at 40° F., 70° F., 90° F., and 110° F. over a period of more than 6 months.

Then, beverage syrups were made according to the formula given in Table 2 above using 3.4 mL of each concentrate.

Each syrup was stable; no phase separation occurred, i.e., no crystal or waxy or oily material floating on the top, at room temperature over a period of more than 3 days.

Then, a finished beverage was made by diluting each syrup in a 1+5 throw with carbonated water. Each beverage was clear and stable, i.e., no phase separation, no crystal, sediment, haze, or oil-off, at 40° F., 70° F., 90° F. and 110° F. over a period of more than 6 months.

COMPARATIVE EXAMPLE 1

A concentrate was made similar to any of Examples 55-64, with the exception that no surfactant was added. Concentrate (1.68 ml) was added to 500 ml of the beverage syrup of Table 2 under agitation. Waxy materials were observed floating on the top of the syrup. This example demonstrates that, in the absence of surfactant, the water-insoluble solid flavor is insoluble in syrup.

COMPARATIVE EXAMPLE 2

A concentrate was made similar to any of Examples 55-64, with the exception that no surfactant was added. Concentrate (0.28 ml) was added to 300 ml of a beverage which is prepared based on the syrup formula given in Table 2 above. Tiny needle-shaped crystals were observed floating in the beverage. This example demonstrates that, in the absence of surfactant, the water-insoluble flavor is insoluble in beverage.

Foaming Test

Ten beverages (300 ml each) as noted in Table 4 below were poured into a 1,000-ml graduated cylinder. The control sample is a beverage based on the syrup set forth in Table 2 above with no surfactant or water-insoluble solid flavor. Samples A through I are similar to the control sample, except insofar as they contain water-insoluble solid flavor at a level of about 25 ppm and surfactant as set forth in Table 4 below. The maximum foaming volume and the time needed for most of the foam to disappear were recorded. The results are as shown in Table 4.

TABLE 4

| sample | surfactant identity | amount (ppm) | maximum foaming volume (ml) | foam disappearance time |
|---|---|---|---|---|
| control | none | 0 | <50 | 13 sec |
| A | Tween 20 | 20 | 540 | 8 min |
| B | Tween 60 | 20 | 520 | 8 min |
| C | Tween 80 | 20 | 520 | 7 min |
| D | Tween 60 | 20 | 520 | 8 min |
|   | Tween 80 | 20 |   |   |
| E | Tween 80 | 20 | 370 | 1.5 min |
|   | Span 80 | 20 |   |   |
| F | Tween 20 | 10 | 430 | 4 min |
| G | Tween 60 | 10 | 420 | 3.5 min |
| H | Tween 80 | 20 | 400 | 3 min |
|   | Span 80 | 5 |   |   |
| I | Tween 80 | 10 | 400 | 2 min |
|   | Span 80 | 2.5 |   |   |

When using surfactant, the maximum foaming volume and foam disappearance time were increased significantly, in comparison to a beverage without any surfactant. However, when the level of surfactant used in the beverage is low as in the present invention, the foaming issue is effectively under control; therefore, the technology is feasible for production. This is another advantage of the present invention.

Other variations and modifications of this invention will be obvious to those skilled in this art. This invention is not to be limited except as set forth in the following claims.

What is claimed is:

1. A method of forming a stable, clear beverage concentrate, said stable, clear beverage concentrate containing water-insoluble solids, comprising dissolving said water-insoluble solids in a non-aqueous solvent to form a solution; and adding a surfactant to said solution to form said stable, clear beverage concentrate, wherein the weight ratio of said water-insoluble solids to said surfactant ranges from about 1.5:1 to about 5:1 and said stable, clear beverage concentrate is not a microemulsion.

2. The method according to claim 1, wherein the water-insoluble solids are selected from the group consisting of flavor compounds, taste modifiers, nutrients, colors and combinations thereof.

3. The method according to claim 2, wherein the water-insoluble solids consist of at least one flavor compound which imparts a physiological sensation of "cooling".

4. The method according to claim 3, wherein the at least one flavor compound is selected from the group consisting of 2-isopropyl- N,2,3-trimethylbutyramide, N-ethyl-p-menthane-3-carboxamide, menthone glycerol ketal, menthyl lactate, (−)-menthoxypropane-1,2-diol, (−)-isopulegol, 4-methyl-3-(1-pyrrolidinyl)-2{5H}-furanone and combinations thereof.

5. The method according to claim 1, wherein the surfactant is selected from the group consisting of sorbitan monolaurate, sorbitan monopalmitate, sorbitan monostearate, sorbitan monooleate, polyoxyethylene (20) sorbitan monolaurate, polyoxyethylene (20) monopalmitate, polyoxyethylene (20) monostearate, polyoxyethylene (20) tri-stearate, polyoxyethylene (20) monooleate, sucrose monomyristate, sucrose palmitate/stearate, sucrose stearate, vitamin E, dioctylsulfosuccinate sodium salt, monoglyceride monooleate, monoglyceride monolaurate, monoglyceride monopalmitate, lecithin, diglyceride mixtures, citric acid esters of monoglycerides, acetic acid esters of monoglycerides, lactic acid esters of monoglycerides, diacetyl tartaric esters of monoglycerides, polyglycerol esters of fatty acids, cyclodextrins, propylene glycol esters of fatty acids, stearoyl lactylates, $C_{8-18}$ free fatty acids and combinations thereof.

6. The method according to claim 5, wherein the surfactant is a polyglycerol ester of fatty acid selected from the group consisting of decaglycerol monocaprylate/caprate, triglycerol monooleate, decaglycerol monostearate, decaglycerol dipalmitate, decaglycerol monooleate, decaglycerol tetraoleate, hexaglycerol dioleate and combinations thereof.

7. The method according to claim 5, wherein the surfactant is a propylene glycol ester of fatty acid selected from the group consisting of dicaprate esters, mono and dicaprylate ester blends, diesters of caprylate and capric acids, and combinations thereof.

8. The method according to claim 1, wherein the non-aqueous solvent is selected from the group consisting of propylene glycol, ethanol, citric acid, benzyl alcohol, triacetin, limonene and combinations thereof.

9. The method according to claim 8, wherein the non-aqueous solvent is a 60:40 combination of propylene glycol and ethanol.

10. The method according to claim 8, wherein the non-aqueous solvent is a 90:10 combination of ethanol and citric acid.

11. The method according to claim 1, wherein the weight ratio of water-insoluble solids to surfactant is about 2.5:1.

12. The method according to claim 1 further comprising the step of adding a co-solvent to said stable, clear beverage concentrate.

13. The method according to claim 12, wherein the co-solvent is selected from the group consisting of propylene glycol, ethanol, citric acid, benzyl alcohol, triacetin, limonene and combinations thereof.

14. The method according to claim 1 further comprising the step of adding an additional ingredient to said stable, clear beverage concentrate.

15. The method according to claim 14, wherein the additional ingredient is a flavor component.

16. A method of forming a stable beverage syrup, said stable beverage syrup containing water-insoluble solids, comprising the steps of:
(a) dissolving said water-insoluble solids in a non-aqueous solvent to form a solution; and adding a surfactant to said solution to form a stable, clear concentrate, wherein the weight ratio of said water-insoluble solids to said surfactant ranges from about 1.5:1 to about 5:1 and said stable, clear concentrate is not a microemulsion; and (b) adding an aliquot of said concentrate to a beverage syrup to form said stable beverage syrup.

17. The method according to claim 16, wherein the water-insoluble solids are selected from the group consisting of flavor compounds, taste modifiers, nutrients, colors and combinations thereof.

18. The method according to claim 17, wherein the water-insoluble solids consist of at least one flavor compound which imparts a physiological sensation of "cooling".

19. The method according to claim 18, wherein the at least one flavor compound is selected from the group consisting of 2-isopropyl- N,2,3trimethylbutyramide, N-ethyl-p-menthane-3-carboxamide, menthone glycerol ketal, menthyl lactate, (−)-menthoxypropane-1,2-diol, (−)-isopulegol, 4-methyl-3-(1pyrrolidinyl)-2{5H}-furanone and combinations thereof.

20. The method according to claim 16, wherein the surfactant is selected from the group consisting of sorbitan monolaurate, sorbitan monopalmitate, sorbitan monostearate, sorbitan monooleate, polyoxyethylene (20) sorbitan monolaurate, polyoxyethylene (20) monopalmitate, polyoxyethylene (20) monostearate, polyoxyethylene (20) tristearate, polyoxyethylene (20) monooleate, sucrose monomyristate, sucrose pahnitate/stearate, sucrose stearate, vitamin E, dioctylsulfosuccinate sodium salt, monoglyceride monooleate, monoglyceride monolaurate, monoglyceride monopalmitate, lecithin, diglyceride mixtures, citric acid esters of monoglycerides, acetic acid esters of monoglycerides, lactic acid esters of monoglycerides, diacetyl tartaric esters of monoglycerides, polyglycerol esters of fatty acids, cyclodextrins, propylene glycol esters of fatty acids, stearoyl lactylates, $C_{8-18}$ free fatty acids and combinations thereof.

21. The method according to claim 20, wherein the surfactant is a polyglycerol ester of fatty acid selected from the group consisting of decaglycerol monocaprylate/caprate, triglycerol monooleate, decaglycerol monostearate, decaglycerol dipalmitate, decaglycerol monooleate, decaglycerol tetraoleate, hexaglycerol dioleate and combinations thereof.

22. The method according to claim 20, wherein the surfactant is a propylene glycolester of fatty acid selected from the group consisting of dicaprate esters, mono and dicarprylate ester blends, diesters of caprylate and capric acids, and combinations thereof.

23. The method according to claim 16, wherein the non-aqueous solvent is selected from the group consisting of propylene glycol, ethanol, citric acid, benzyl alcohol, triacetin, limonene and combinations thereof.

24. The method according to claim 23, wherein the non-aqueous solvent is a 60:40 combination of propylene glycol and ethanol.

25. The method according to claim 23, wherein the non-aqueous solvent is a 90:10 combination of ethanol and citric acid.

26. The method according to claim 16, wherein the weight ratio of water-insoluble solids to surfactant is about 2.5:1.

27. The method according to claim 16 further comprising the step of adding a co-solvent to said stable, clear beverage concentrate.

28. The method according to claim 27, wherein the co-solvent is selected from the group consisting of propylene glycol, ethanol, citric acid, benzyl alcohol, triaeetin, limonene and combinations thereof.

29. The method according to claim 16 further comprising the step of adding an additional ingredient to said stable, clear beverage concentrate.

30. The method according to claim 29, wherein the additional ingredient is a flavor component.

31. The method according to claim 16, wherein the beverage syrup comprises preservative, sweetener, pH adjusters, flavor and water.

32. The method according to claim 31, wherein the beverage syrup comprises lemon/lime flavor.

33. The method according to claim 16, wherein an aliquot sufficient for a 0.5 or 1 gallon per unit configuration is added to the beverage syrup.

34. A method of forming a stable, clear beverage, said stable, clear beverage containing water-insoluble solids, comprising the steps of:
(a) dissolving said water-insoluble solids in a non-aqueous solvent to form a solution; and adding a surfactant to said solution to form a stable, clear concentrate, wherein the weight ratio of said water-insoluble solids to said surfactant ranges from about 1.5:1 to about 5:1 and said stable, clear concentrate is not a microemulsion;
(b) adding an aliquot of said stable, clear concentrate to a beverage syrup to form a stable beverage syrup; and
(c) diluting said stable beverage syrup to form said stable, clear beverage.

35. The method according to claim 34, wherein the water-insoluble solids are selected from the group consisting of flavor compounds, taste modifiers, nutrients, colors and combinations thereof.

36. The method according to claim 35, wherein the water-insoluble solids consist of at least one flavor compound which imparts a physiological sensation of "cooling".

37. The method according to claim 36, wherein the at least one flavor compound is selected from the group consisting of 2-isopropyl- N,2,3-trimethylbutyramide, N-ethyl-p-menthane-3-carboxamide, menthone glycerol ketal, menthyl lactate, (−)-menthoxypropane-1,2-diol, (−)-isopulegol, 4-methyl-3-(1-pyrrolidinyl)-2{5H}-furanone and combinations thereof.

38. The method according to claim 34, wherein the surfactant is selected from the group consisting of sorbitan monolaurate, sorbitan monopalmitate, sorbitan monostearate, sorbitan monooleate, polyoxyethylene (20) sorbitan monolaurate, polyoxyethylene (20) monopalmitate, polyoxyethylene (20) monostearate, polyoxyethylene (20) tristearate, polyoxyethylene (20) monooleate, sucrose monomyristate, sucrose palmitate/stearate, sucrose stearate, vitamin E, dioctylsulfosuccinate sodium salt, monoglyceride monooleate, monoglyceride monolaurate, monoglyceride monopalmitate, lecithin, diglyceride mixtures, citric acid esters of monoglycerides, acetic acid esters of monoglycerides, lactic acid esters of monoglycerides, diacetyl tartaric esters of monoglycerides, polyglycerol esters of fatty acids, cyclodextrins, propylene glycol esters of fatty acids, stearoyl laetylates, $C_{8-18}$ free fatty acids and combinations thereof.

39. The method according to claim 38, wherein the surfactant is a polyglycerol ester of fatty acid selected from the group consisting of decaglycerol monocaprylate/caprate, triglycerol monooleate, decaglycerol monostearate, decaglycerol dipalmitate, decaglycerol monooleate, decaglycerol tetraoleate, hexaglycerol dioleate and combinations thereof.

40. The method according to claim 38, wherein the surfactant is a propylene glycol ester of fatty acid selected from the group consisting of dicaprate esters, mono and dicarprylate ester blends, diesters of caprylate and capric acids, and combinations thereof.

41. The method according to claim 34, wherein the non-aqueous solvent is selected from the group consisting of propylene glycol, ethanol, citric acid, benzyl alcohol, triacetin, limonene and combinations thereof.

42. The method according to claim 41, wherein the non-aqueous solvent is a 60:40 combination of propylene glycol and ethanol.

43. The method according to claim 41, wherein the non-aqueous solvent is a 90:10 combination of ethanol and citric acid.

44. The method according to claim 34 wherein the weight ratio of water-insoluble solids to surfactant is about 2.5:1.

45. The method according to claim 34 further comprising the step of adding a co-solvent to said stable, clear concentrate.

46. The method according to claim 45, wherein the co-solvent is selected from the group consisting of propylene glycol, ethanol, citric acid, benzyl alcohol, triacetin, limonene and combinations thereof.

47. The method according to claim 34 further comprising the step of adding an additional ingredient to said stable, clear beverage concentrate.

48. The method according to claim 47, wherein the additional ingredient is a flavor component.

49. The method according to claim 34, wherein the beverage syrup comprises preservative, sweetener, pH adjusters, flavor and water.

50. The method according to claim 49, wherein the beverage syrup comprises lemon/lime flavor.

51. The method according to claim 34, wherein an aliquot sufficient for a 0.5 or 1 gallon per unit configuration is added to the beverage syrup.

52. The method according to claim 34, wherein dilution is accomplished using carbonated water, noncarbonated water or a mixture thereof.

53. The method according to claim 34, wherein dilution is accomplished in a 1+5 throw.

54. A method of forming a stable beverage concentrate, said stable beverage concentrate containing water-insoluble solids, comprising the step of:
(a) dissolving said water-insoluble solids in a non-aqueous solvent to form a solution; and adding a surfactant to said solution to form said stable beverage concentrate, wherein the weight ratio of said water-insoluble solids to said surfactant ranges from about 1.5:1 to about 5:1 and said stable beverage concentrate is not a microemulsion.

55. A method of forming a stable beverage, said stable beverage containing water-insoluble solids, comprising the steps of:
(a) dissolving said water-insoluble solids in a non-aqueous solvent to form a solution; and adding a surfactant to said solution to form a stable beverage concentrate, wherein the weight ratio of said water-insoluble solids to said surfactant ranges from about 1.5:1 to about 5:1 and said stable beverage concentrate is not a microemulsion;
(b) adding an aliquot of said stable beverage concentrate to a beverage syrup; and
(c) diluting said beverage syrup to form said stable beverage.

* * * * *